(12) United States Patent
Zapf

(10) Patent No.: US 7,445,288 B2
(45) Date of Patent: Nov. 4, 2008

(54) VEHICLE SEAT

(76) Inventor: Otto Zapf, Herzog-Adolph-Strasse 2, 61462 Konigstein (DE)

( * ) Notice: Subject to any disclaimer, the term of this patent is extended or adjusted under 35 U.S.C. 154(b) by 15 days.

(21) Appl. No.: 11/628,704

(22) PCT Filed: Jun. 8, 2005

(86) PCT No.: PCT/EP2005/006149

§ 371 (c)(1),
(2), (4) Date: Dec. 5, 2006

(87) PCT Pub. No.: WO2005/120885

PCT Pub. Date: Dec. 22, 2005

(65) Prior Publication Data

US 2007/0252421 A1 Nov. 1, 2007

(30) Foreign Application Priority Data

Jun. 9, 2004 (DE) .................. 10 2004 027 900

(51) Int. Cl.
*B60N 2/00* (2006.01)

(52) U.S. Cl. .................. 297/354.11; 297/284.3; 297/230.14

(58) Field of Classification Search ............ 297/354.11, 297/284.3, 230.1, 230.13, 230.14, 378.1
See application file for complete search history.

(56) References Cited

U.S. PATENT DOCUMENTS

| | | | | |
|---|---|---|---|---|
| 4,291,916 A | * | 9/1981 | Chardon | 297/354.11 |
| 4,641,884 A | * | 2/1987 | Miyashita et al. | 297/284.3 |
| 5,120,109 A | * | 6/1992 | Rangoni | 297/284.3 X |
| 6,309,018 B1 | * | 10/2001 | Jernstrom | 297/284.4 X |
| 6,478,379 B1 | * | 11/2002 | Ambasz | 297/354.11 X |

* cited by examiner

*Primary Examiner*—Anthony D. Barfield
(74) *Attorney, Agent, or Firm*—Kirschstein, et al.

(57) ABSTRACT

A vehicle seat, comprising an upholstered seat surface and an upholstered backrest, whereby the backrest may be folded forward about a first horizontal pivoting axis. A backrest element is integrated close to the front side of the upholstered backrest, which may be pivoted in the backrest about a second horizontal pivoting axis, which, in side view, is higher than the first horizontal pivoting axis. The backrest element is curved in the region of the second horizontal pivoting axis, such that an upper backrest piece is formed above the second horizontal pivoting axis and a lower backrest piece is formed below the second horizontal pivoting axis, which are inclined towards each other in the direction of the front side of the backrest. A mid upper area of the upper backrest piece lying in the lateral direction of the backrest and a mid lower area of the lower backrest piece lying in the lateral direction of the backrest, have a greater elasticity than the rest of the backrest element, or both said areas may be arched backwards.

11 Claims, 3 Drawing Sheets

VEHICLE SEAT

The present invention relates to a vehicle seat comprising an upholstered seat and an upholstered back rest as in accordance with the preamble of Claim 1.

A vehicle seat is considered a seat which can be used in an automobile, a truck, a bus, a railway train or an aircraft.

In the state of the art an aircraft seat has already been described which comprises an upholstered seat and an upholstered back including a head rest wherein between the headrest and one back portion of the back rest a bending line is formed around which the head rest is fixedly inclined in forward direction (GB 1,056,648). The aircraft seat comprises a lower stationary seat frame and, above thereof, an upper frame movable on rolls in horizontal direction, both frames having angle-shaped upwardly bent arms. Both arms are connected with each other via further frame elements in the back rest. In more detail, a rear frame element is tiltingly connected with the uprising arms of the lower frame and a further rear frame element is in tilting connection with the uprising arms of the upper seat frame, namely by elements telescopically movable relative towards each other. The telescopically co-operating elements permit longitudinal movement of the upper seat frame relative to the lower seat frame whereby they are tilted relative to the rear frame elements. A swivel point, or swivel axis, respectively, on the uprising arms of the upper seat frames can therefore horizontally be moved, together with the seat area and the upper seat frame, and thus can supportively act onto the loin area of a passenger sitting on the seat, the rear area of the back rest maintaining its position. However, it is also possible that, if required, the complete back rest may be folded in forward direction around the tilting positions, or tilting axes, respectively, which are positioned at substantially the same height at the uprising arms of the upper seat frame and the lower seat frame.—This aircraft seat evidently comprises a sophisticated multi-member frame structure. Nonetheless, the support of the loin area of the passenger is not optimum since, in particular, it extends undifferentiatedly over the complete width of the back rest.

It is the aim of the present invention to increase the seating comfort by means of a non-complicated seat structure.

To solve the problem use is made of a principle which has been known in connection with a piece of seat furniture as in accordance with DE 3826290 C2 and U.S. Pat. No. 5,018,791 which has been transferred, in an adapted way, to a vehicle seat having an upholstered seating area and an upholstered back rest which in particular can be bent, relative to the seating area, in forward direction.

To this end, the vehicle seat includes the features given in the characterizing clause of claim 1.—The comfort-increasing features are thus realized in a back rest element which is built, i.e. integrated, into the upholstery of the vehicle seat. This back rest element is completely covered by the outer cover of the upholstered back rest so that the complete vehicle seat is also esthetically appealing. The comfort-increasing features of the back rest element consist in that the latter, in a lateral view, in the area of a second horizontal tilting axis about which the back rest element in the back rest can be is tilted at a vertical distance above the seating area, is bent whereby, above the second horizontal tilting axis, an upper back rest portion and, under the second horizontal tilting axis, a lower backrest portion are defined which, seen from the front, are bent toward each other. At the transition location of the upper back rest portion to the lower back rest portion, the back rest element is curved or arched, respectively, or bent. The second horizontal tilting axis in this position is at the height of an—also imaginary—arm rest of the vehicle seat. A middle upper area of the upper back rest portion and a middle lower area of the lower back rest portion have a better elasticity than the remaining back rest element. These two areas may rearwardly be arched instead. The better elasticity of the middle upper area of the upper back rest portion and of the middle lower area of the lower back rest portion may essentially be obtained by elastic straps applied to the remaining inflexible back rest element. When a person is sitting on the vehicle seat, the elastic areas arch out rearwardly. When, on the other hand, leaving out the elasticity of the areas referred to, the rearward arching out otherwise obtained in the elastic areas can also be obtained in that the middle upper area of the upper back rest portion and the middle lower area of the lower back rest portion are shaped to be rearwardly arched within an essentially inflexible back rest element. It is common to both alternatives that these ranges support in a most agreeable way the back of a sitting person. The even supporting effect of these areas is further promoted by the ability of the back rest element to tilt about the first horizontal tilting axis.—The back rest element referred to constitutes substantially an inflexible, deformed plate. Since this element is built near the front of the upholstered back rest into it, the comfort-increasing properties of the back rest element develop their favorable effect in practice completely onto the person in the sitting position.

In addition, the back rest element may include, as in accordance with claim 4, a comfort-increasing padding of upholstering material such as foam material.

The second horizontal tilting axis of the back rest element is coveredly provided, according to claim 2, within the upholstered back rest.

The second horizontal tilting axis may preferably be formed, according to claim 3, in a robust and comfort-increasing way by at least one elastomer part adjacent to which one reverse side of the backrest element is provided. The elastomer part may, on one hand, be connected with the back rest element and may preferably be movably guided within the upholstered back rest, as will later be described in detail, The vehicle seat can, nevertheless, be folded forwards, which may particularly be desirable for automobiles, in that the upholstered back rest together with the integrated back rest element can be tilted in forward direction about the first horizontal tilting axis which is disposed lower than the second horizontal tilting axis. The embodiment of the vehicle seat foldable in forward direction is non-problematic in connection with the comfort-increasing back rest element if and when the upholstered back rest is disposed at a distance above the seating area so that the lower portion of the back rest will not touch the seating area even when being folded down.

In a further development of the vehicle seat including the comfort-increasing back rest element, the latter may also be integrated into the upholstered back rest if it is disposed, as is particularly the case in automobiles, tightly to the upholstered seating areas and may be pressed into the upholstered seating area when being folded down. In such case, foldability should not be impaired by the back rest element integrated in the upholstered back rest. The seating area and the upholstered back rest, moreover, should not be damaged by frequently folding the back rest over a longer period of time. To this end, and in a first further development of the vehicle seat, the second horizontal tilting axis is movable, according to claim 5, together with the back rest element, substantially upwards, i.e. substantially in parallel to the reverse side of the back rest and within the latter. To effect this, the second horizontal tilting axis may be guided with the back rest element on a bearing portion within the back rest. Thus, when folding down the upholstered back rest in forward direction, the back rest, responsive to even a slight pressure of the underside of the back rest onto the seating area, may recede upward again.

The slidability of the back rest element in the upholstered back rest becomes possible, or is promoted, respectively, by a free space in the upholstered back rest above the back rest element into which an upper section of the back rest element is being pushed, when folding the back rest in forward direction and supporting the back rest element by the seating area. Under seating area, the rearward extension thereof underneath the back rest area is to be understood as well.

The covers of the upholstered seating area and of the upholstered back rest of that area where one underside of the back rest glides over the seating area when being folded in forward direction is further saved in that, according to claim 7, a lower section of the back rest element is bent in backward direction. Thereby, the specific contact pressure of that portion of the back rest element which rests on the seating area when the back rest is being folded is reduced.

The protection of the covers is also the aim of the measure according to claim 8 in that the lower portion of the back rest element has also a better elasticity beyond the middle part of the lower back rest portion than the remaining back rest element. This elasticity can be promoted, according to claim 9, by the provision of slits in the lower section.

According to claim 10, the cover cloth of the upholstered back rest is preferably highly elastic in the area of the slidable back rest element, suitably at the ends of the back rest element by an insert provided in the cover material. In this way, the back rest element is safely secured in the upholstered back rest in spite of a slight movability and the aesthetic appearance of the back rest remains unimpaired.

If the upholstered back rest including the back rest element is further developed, as defined above, the first tilting axis about which the back rest can be folded in forward direction, may be disposed, without any disadvantageous effects on the operability of the back rest and the wear of the cover cloths, at the reverse side of the back rest, below, as preferred in many cases.

In the following, the invention will be described based on a drawing including three figures wherein FIG. 1 is a lateral view, partly in section, of a vehicle seat having a back rest in upright position and, at the same time, with the back rest in a forward-folded state.

Figure 1:
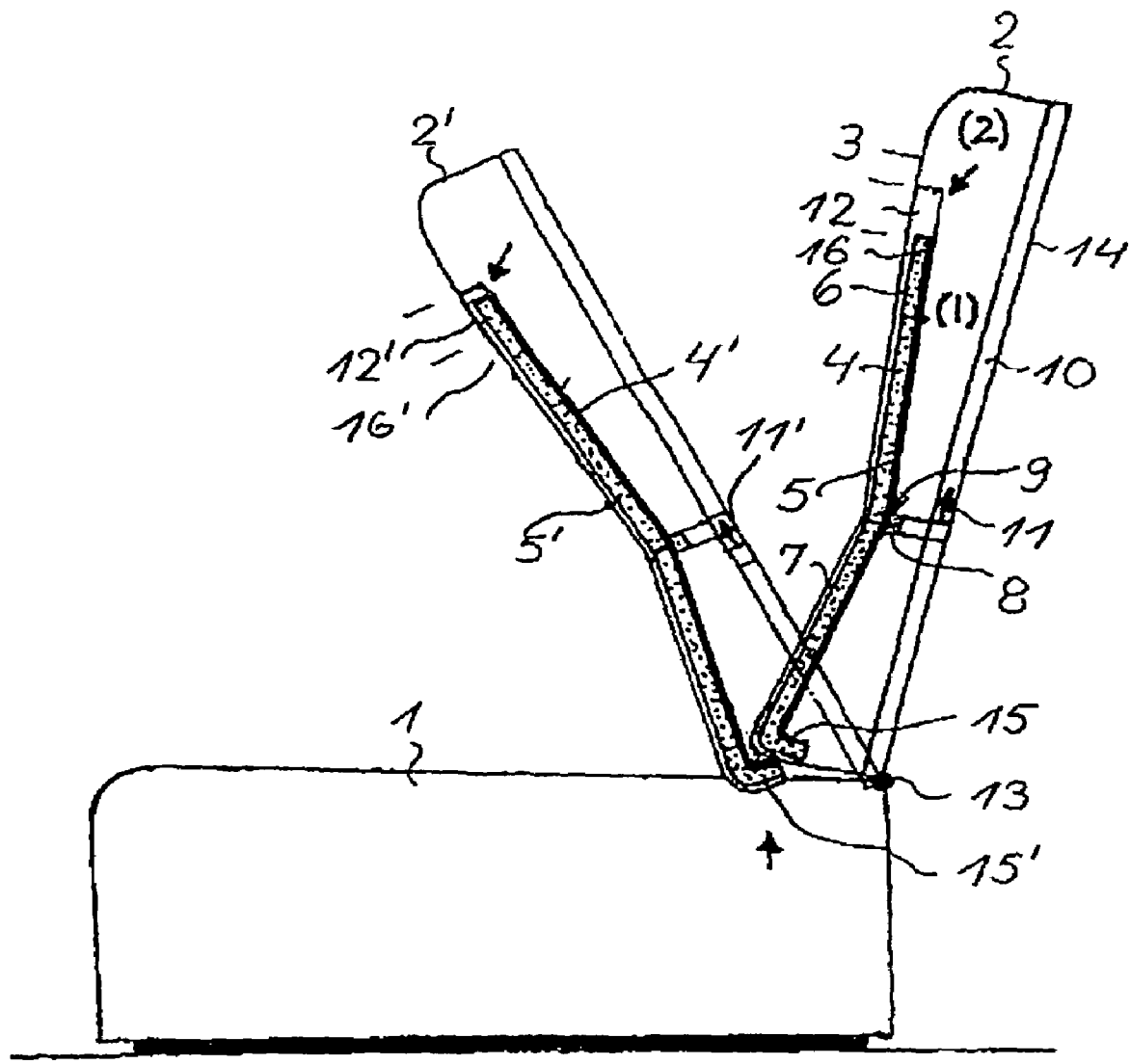

In FIG. 1, 1 is an upholstered seating area and 2 is an upholstered back-rest of the vehicle seat. If required, the back rest can be folded in forward direction. The back rest shown in FIG. 1 in folded position as well, is designated by 2'. (Further reference numerals are analogously varied.) It is folded in forward direction about a first horizontal tilting axis 13 which is disposed in the area of back 14 of the back rest on seating area 1. Into upholstered back rest 2, or 2', respectively, near the forefront 3 thereof, a back rest element 4, or 4', respectively, has been built-in.

Figure 2:
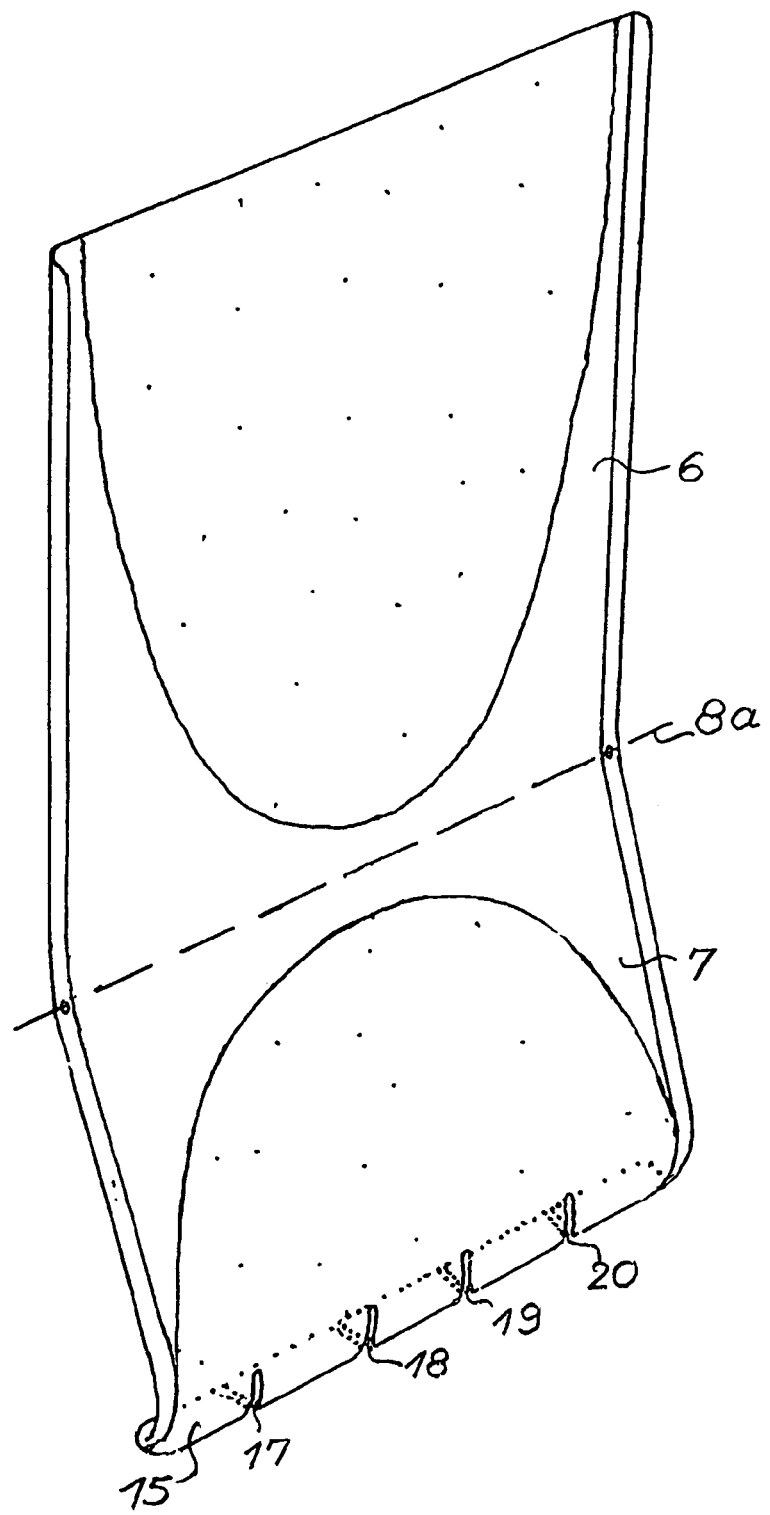
FIG. 2 is a diagrammatic view of the back rest element.

Back rest element 4 comprises a bearing inflexible plate which is curved, along a horizontal line perpendicular to the drawing plane of FIG. 1, so that an upper back rest portion 6, above the line, and a lower back rest portion 7, below the line, as seen from the front 3, are inclined towards each other. This non-designated horizontal line is so near at a second horizontal tilting axis 8 that it practically coincides with the latter.— The upper back rest portion 6 and the lower back rest portion 7 each have a middle upper area, and a middle lower area, respectively, of substantially larger elasticity than the remaining back rest element. The areas of different elasticity can be obtained by means of the inflexible plate in that the latter constitutes a bearing portion of the back rest element substantially outside the middle upper area and the middle lower area. These areas different as to elasticity/inflexibility of upper back rest portion 6 and of lower back rest portion 7 are depicted in FIG. 2 separated from each other. In the embodiment according to FIG. 2, furthermore, different from the embodiment of FIG. 1, the second horizontal tilting axis 8a has been shifted into the back rest element.—In a further embodiment, the back rest element may completely consist of an inflexible plate if it is rearwardly curved in the middle upper area of the upper back rest portion and in the middle lower area of the lower back rest portion.

It is only FIG. 1 which shows how back rest element 4, or 4', respectively, comprises a comfort-increasing padding layer 5, or 5', respectively, of upholstering material on the front side thereof.

Back rest element 4, or 4', respectively, can in any case be tilted about second horizontal tilting axis 8 disposed in upholstered back rest 2, or 2', respectively. In FIG. 1, tilting axis 8 is realized in an elastomer potion 9 which can upwardly be shifted on a bearing part 10 of the back rest, see arrow 11, when the back rest is being folded in forward direction. Elastomer portion 9 is, in that case, drawn along by back rest element 4 with which it is connected. For an easier movement of the back rest element, there is provided within the upholstered back rest 2 below the cover material near the front a free space 12 which is not filled out, in sitting position, by back rest element 4.

When folding back rest 2 in forward direction, a lower section 15 of back rest element 4' presses, from above, onto the upholstered seating area 1, exaggeratedly depicted in FIG. 1 at positions 2' and 15'. By the pressure, back rest element 4' will be shifted upward in the direction of arrow 11'. An upper section 16' of back rest element 4' can now fill out free space 12'.

Figure 3:
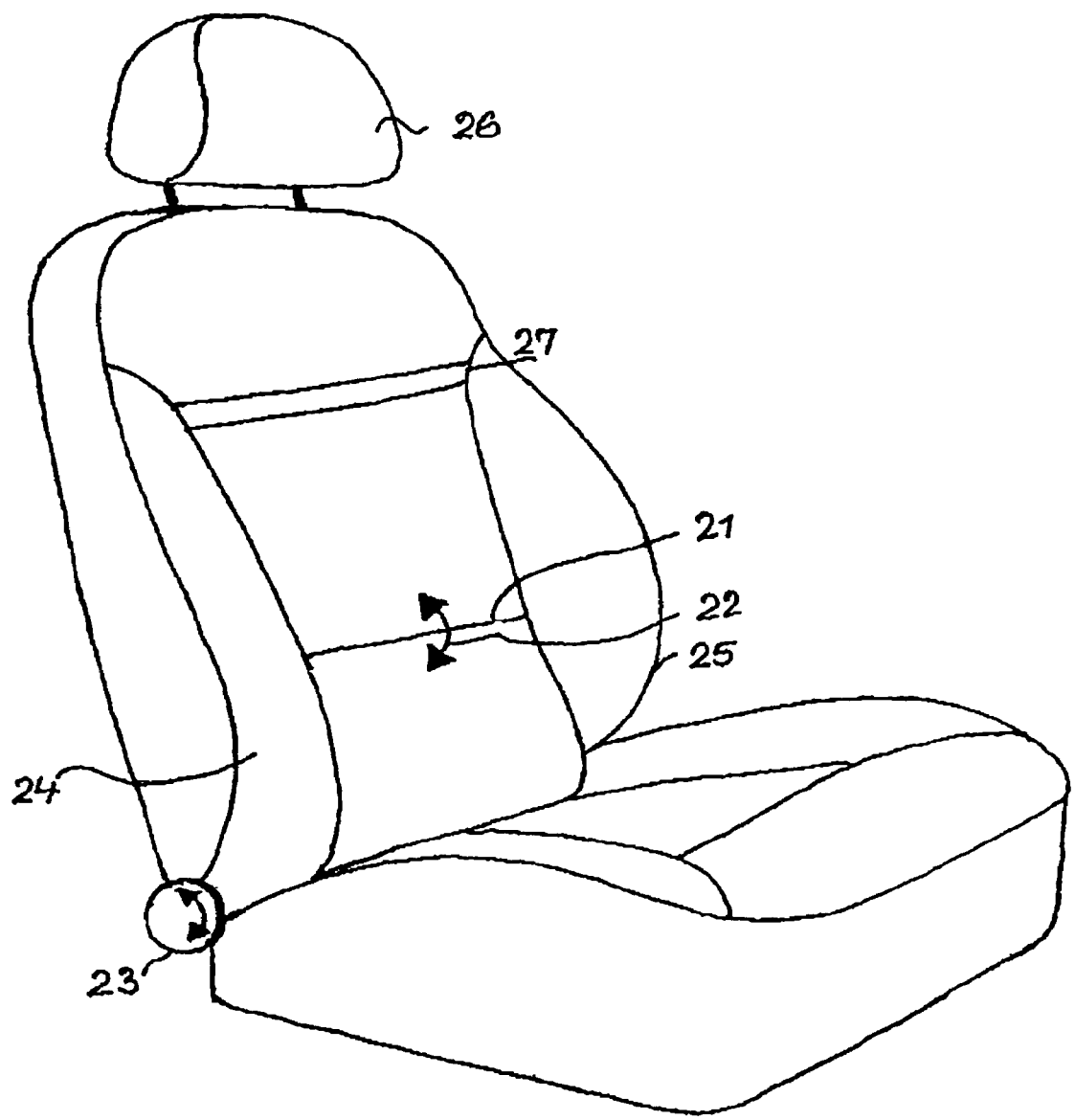
FIG. 3 is a diagrammatic view of a further embodiment of an automobile seat foldable in forward direction.

From FIG. 1, it can also be taken how the lower section 15, or 15', respectively, of back rest element 4' is bent to the rear so that it can rest over a relatively large area of upholstered seating area 1 and effect the shift of back rest element 4' reliably and without any damage to the cover cloths of the upholstered back face and the upholstered back rest. Lower section 15, or 15', respectively, has an increased elasticity promoted by slits 17 to 20, see FIG. 2. For the upholstered back rest, at least in the area of back rest element 4, or 4', respectively, and of free space 12, or 12', respectively a particularly elastic cover material should be selected. It may be sufficient if there is only one insert piece 27 of elastic cover material in the cover cloth of the back rest, see FIG. 3. In FIG. 3, the second horizontal tilting axis 22 is shown somewhat highlighted. The inclination of the upper back rest portion and the lower back rest portion which are not designated by numerals in FIG. 3 is indicated by an angle 22. The first horizontal tilting axis links centrally to a hand wheel 23 for folding the back rest.

As can be taken from FIG. 3, the comfort-increasing back rest element may particularly harmoniously and hardly noticeably be integrated into a back rest if the latter is provided with laterally supporting upholstering portions 24, 25 and a head rest 26. In such a vehicle seat, comfort and safety are at an optimum.

An insert piece of particularly elastic cover material is shown by numeral 27.

By the structure described, neither the comfort-increasing properties of the upholstered back rest combined with the back rest element, on one hand, nor the folding thereof, on the other, will be impaired.

| List of reference numerals | | |
|---|---|---|
| 1 | upholstered seating area | FIG. 1 |
| 2 | upholstered back rest | |
| 3 | front | |
| 4 | back rest element | |
| 5 | padding layer of upholstering material | |
| 6 | upper back rest portion | |
| 7 | lower back rest portion | |
| 8, 8a | second horizontal tilting axis | |
| 9 | elastomer portion | |
| 10 | bearing portion | |
| 11 | arrow | |
| 12 | free space | |
| 13 | first horizontal tilting axis | |
| 14 | back | |
| 15 | lower section | |
| 16 | upper section | |
| 17 | slit | FIG. 2 |
| 18 | slit | |
| 19 | slit | |
| 20 | slit | |
| 21 | second horizontal tilting axis | FIG. 3 |
| 22 | angle | |
| 23 | hand wheel | |
| 24 | lateral upholstered portion | |
| 25 | lateral upholstered portion | |
| 26 | head rest | |
| 27 | insert piece of elastic cover material | |

The invention claimed is:

1. A vehicle seat, comprising:
an upholstered seatrest;
an upholstered backrest tiltable in a forward direction about a first horizontal axis relative to the seatrest and having a cover that contacts a user's back in use; and
a backrest element integrated as an insert within the backrest underneath and adjacent the cover for supporting the user's back in use, the backrest element being pivotable within the backrest above the seatrest about a second horizontal axis disposed above the first horizontal axis, the backrest element having an upper rigid outer portion located above the second horizontal axis, and a lower rigid outer portion located below the second horizontal axis, the upper and lower rigid outer portions being inclined and forming an obtuse angle relative to each other.

2. The vehicle seat according to claim 1, wherein the second horizontal axis is disposed within, and extends through, the backrest.

3. The vehicle seat according to claim 1, wherein the backrest element includes an elastomeric portion adjacent the second horizontal axis.

4. The vehicle seat according to claim 1, and a padding layer of upholstery material between the cover and the backrest element.

5. The vehicle seat according to claim 1, wherein the backrest element is mounted for sliding movement within the backrest.

6. The vehicle seat according to claim 5, wherein the backrest includes a space above the backrest element into which the backrest element is free to slide when tilting the backrest in the forward direction.

7. The vehicle seat according to claim 6, wherein the backrest element has a bent base portion in contact with the seatrest for urging the backrest element into the space when the backrest is tilted in the forward direction.

8. The vehicle seat according to claim 7, wherein the bent base portion has a plurality of slits.

9. The vehicle seat according to claim 6, wherein the cover is constituted of an elastic material in an area overlying the space.

10. The vehicle seat according to claim 1, wherein the upper and lower rigid outer portions are formed as a single rigid plate.

11. The vehicle seat according to claim 1, wherein the backrest element has an upper elastic central portion located above the second horizontal axis, and a lower elastic central portion located below the second horizontal axis, and wherein the upper and lower elastic central sections are yieldable in a backward direction opposite to the forward direction.

\* \* \* \* \*